United States Patent [19]

Creyaufmüller

[11] Patent Number: 5,049,713

[45] Date of Patent: Sep. 17, 1991

[54] APPARATUS FOR PREPARING HOT BEVERAGES IN A MICROWAVE OVEN

[75] Inventor: Peter Creyaufmüller, Minden, Fed. Rep. of Germany

[73] Assignee: Melitta-Werke Bentz & Sohn, Minden, Fed. Rep. of Germany

[21] Appl. No.: 526,007

[22] Filed: May 21, 1990

[30] Foreign Application Priority Data

May 20, 1989 [DE]  Fed. Rep. of Germany ....... 3916457
Jan. 11, 1990 [DE]  Fed. Rep. of Germany ....... 4000634

[51] Int. Cl.$^5$ ........................... H05B 6/80; A23F 5/26
[52] U.S. Cl. ...................... 219/10.55 E; 219/10.55 R; 99/306; 99/DIG. 14; 426/241
[58] Field of Search .................. 219/10.55 E, 10.55 R; 99/306, 300, DIG. 14, 304, 302 R; 426/241

[56]  References Cited

U.S. PATENT DOCUMENTS

| | | | |
|---|---|---|---|
| 3,063,359 | 11/1962 | Brant | 99/306 |
| 3,080,810 | 3/1963 | Saint | 99/306 |
| 4,104,957 | 8/1978 | Freedman et al. | 219/10.55 E |
| 4,381,696 | 5/1983 | Koral | 219/10.55 E |
| 4,386,109 | 5/1983 | Bowen et al. | 219/10.55 E |
| 4,642,443 | 2/1987 | Jorgensen et al. | 219/10.55 E |
| 4,900,886 | 2/1990 | Bridges | 219/10.55 E |
| 4,908,222 | 3/1990 | Yu | 219/10.55 E |

FOREIGN PATENT DOCUMENTS 2829567  2/1984  Fed. Rep. of Germany .

Primary Examiner—Philip H. Leung
Attorney, Agent, or Firm—Spencer & Frank

[57]     ABSTRACT

Apparatus for preparing hot beverages in a microwave oven has a lower carafe for receiving the finished brewed hot beverage and an upper reservoir having a bottom and retaining fresh water therein. The reservoir may be placed on the carafe and has a shut-off member disposed inside. The shut-off member has an inlet in the interior of the reservoir and an outlet extending through the bottom of the reservoir, and the shut-off member is a pipe which functions as a siphon or as an overflow. The reservoir is substantially air tight, and a vent is in the carafe for exhausting fluid from and into the carafe. Alternatively, the reservoir is fluidly connected to the carafe and the carafe has a one-way valve for only exhausting fluid from the carafe.

5 Claims, 3 Drawing Sheets

APPARATUS FOR PREPARING HOT BEVERAGES IN A MICROWAVE OVEN

CROSS-REFERENCE TO RELATED APPLICATIONS

This application claims the priority of Federal Republic of Germany Application Nos. P 39 16 457.8 filed May 20th, 1989 and P 40 00 634.4 filed Jan. 11th, 1990, both of which are incorporated herein by reference.

BACKGROUND OF THE INVENTION

This invention relates to a device for preparing hot beverages in a microwave oven. The device has a lower carafe for the finished brewed hot beverage as well as a fresh water holder which may be placed on top of the carafe. The fresh water holder has a bottom and a shut-off device which has an inlet in the interior of the fresh water holder and which has an outlet extending through the bottom thereof.

A device of the above-outlined type is known from German Offenlegungsschrift (non-examined published application) 2,829,567, which is a counterpart to U.S. Pat. No. 4,104,957. In that apparatus the shut-off device includes a bimetal valve which means that the shut-off device has moving parts and the opening or unblocking of the outlet is dependent on the response behavior of the bimetal which actuates the valve.

SUMMARY OF THE INVENTION

It is an object of the invention to provide an improved apparatus of the above-outlined type that has a simplified, error-free and disturbance-resistant construction that ensures that only sufficiently heated water comes in contact with an aromatics or flavor carrier, such as coffee or tea.

This object and others to become apparent as the specification progresses, are accomplished by an embodiment of the invention, according to which, briefly stated, the shut-off device includes a siphoning overflow pipe, the fresh water holder or reservoir is airtight, and the carafe is bidirectionally open to the atmosphere.

According to another embodiment, the shut-off device has a siphoning overflow pipe, the bottom of a vented fresh water holder has a drip opening in an area outside of the area of the outlet of the pipe, and the carafe has a one-way valve in the region of engagement with the fresh water holder that only allows air to exit from the carafe into the atmosphere.

Such shut-off devices have no moving parts so that in the embodiments of the invention a simplified and disturbance-resistant construction of the invention is accomplished.

In the first preferred embodiment of the invention discussed above the water in the reservoir is heated by placing the entire device in a microwave oven. As a result of the microwave heating a higher than atmospheric pressure is developed in the airtight reservoir, by which the heated water is forced through the pipe and out of the reservoir. The microwave heating continues as long as a generation of water vapor in the airtight reservoir is necessary; that is, until the reservoir has been practically completely emptied. At that point the reservoir is almost completely filled with water vapor. After turning off the microwave oven the water vapor cools and condenses, thus developing a lower than atmospheric pressure in the reservoir. This low pressure causes air to be drawn into the reservoir through the pipe, as at that time there is no longer any water driven through the pipe and thus the latter may serve as a ventilation pipe for the reservoir. The drawing in of air into the reservoir is possible because the carafe underneath the reservoir is designed to allow air to both enter and leave the carafe.

The second preferred embodiment of the invention discussed above, operates on a somewhat different principle. Upon microwave heating the water in the reservoir along with the air in the carafe are heated. In addition, the water which has dripped through the drip opening in the bottom of the reservoir is heated, whereby water vapor is developed in the carafe. Both the heated air and some of the water vapor in the carafe are forced out of the valve in the carafe that allows flow in only one direction. After significant heating of the water in the reservoir the microwave oven is turned off, and the water vapor in the carafe cools very quickly and condenses, resulting in a partial vacuum in the carafe that acts on the reservoir and draws out the heated water through the pipe. One has only to ensure that the partial vacuum developed in the carafe suffices to completely draw out the heated water from the reservoir. A prerequisite for this is the provision of a sufficiently large carafe, of which the appropriate size can be readily determined by simple experiments.

DESCRIPTION OF THE PREFERRED EMBODIMENTS

Figure 1:
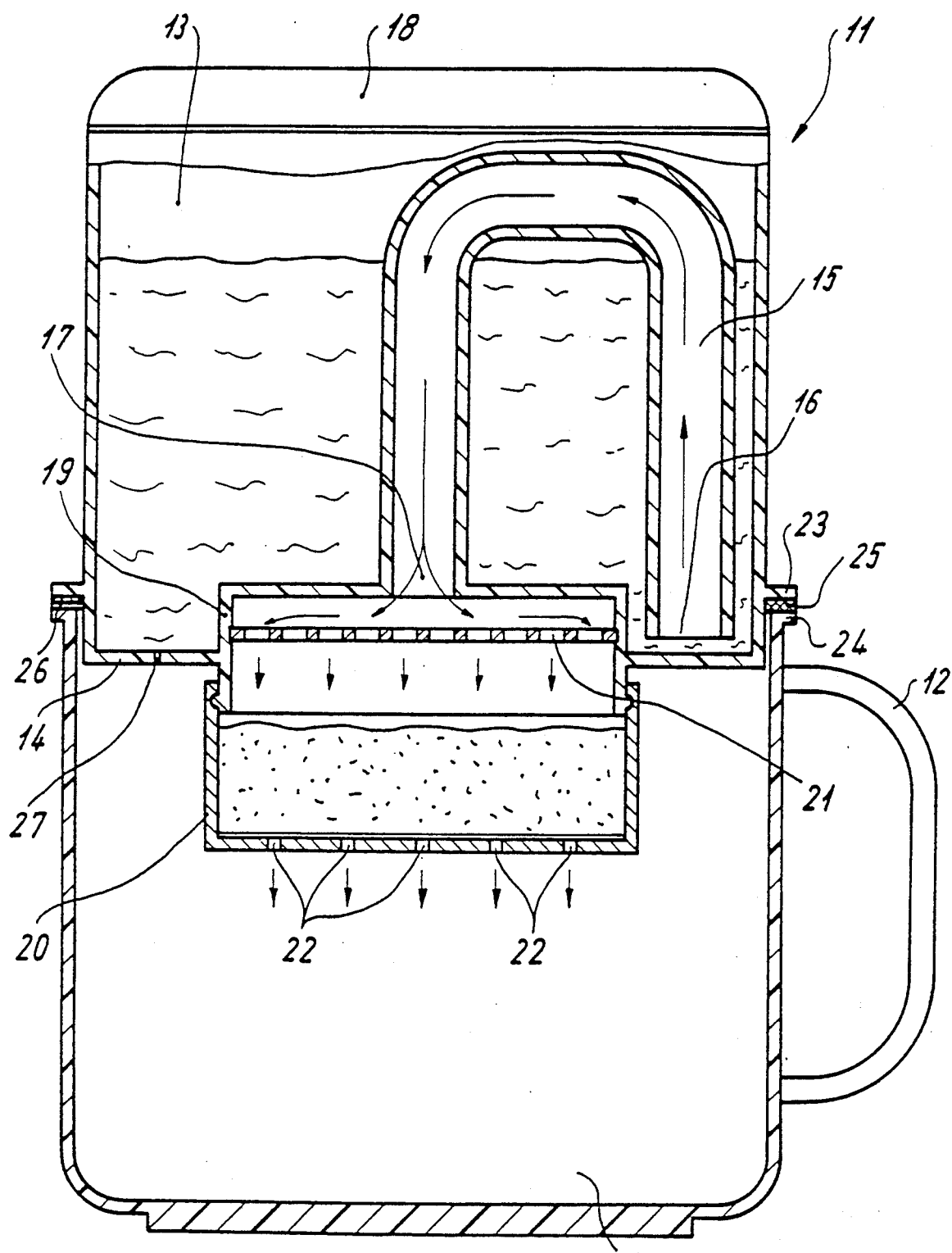
FIG. 1 is a sectional side elevational view of a preferred embodiment of the invention for preparing hot beverages in a microwave oven.

Turning to FIG. 1, the device 11 for preparing hot beverages in a microwave oven shown therein has a lower coffee or tea carafe 10. Carafe 10 collects the finished brewed hot beverage, such as coffee or tea, and is preferably a pot with a handle 12. A fresh water holder or reservoir 13 having a bottom 14 is attached on top of carafe 10 in a form-locking manner.

Reservoir 13 has a siphoning overflow pipe 15 which has an entry opening 16 located in the interior of reservoir 13 and which has an outlet opening 17 opening to the exterior through bottom 14. Siphoning overflow pipe 15 can function as an overflow or as a siphon. There is also a removable lid 18 on top of reservoir 13. Reservoir 13 is open to the atmosphere, and is ventilated by a vent in lid 18 or, alternatively, lid 18 can be placed on top of reservoir 13 in a manner which allows air to enter.

In the preferred embodiment of FIG. 1, outlet opening 17 of pipe 15 opens into an attached nozzle 19 which extends outwardly from bottom 14 of reservoir 13. There is a filter holder 20 removably attached to the outwardly extending regions of nozzle 19. The attachment can be made by a bayonet- or screw-type member. Nozzle 19 includes a sieve 21 for spreading out the heated water from outlet opening 17 and for releasing the water into filter holder 20. The bottom of filter holder 20 also has a plurality of outlet openings 22.

Reservoir 13 rests, with a circumferential flange 23, on top of an upper rim 24 of carafe 10, preferably with an encircling seal 25 therebetween. In the supporting regions between reservoir 13 and carafe 10 there is at least one ventilation opening 26 in the form of a one-way valve through which air is vented to the exterior of carafe 10, and into which no air can enter when reservoir 13 is in place on top of carafe 10.

At least one very small drip opening 27 is provided in bottom 14 of reservoir 13 in an area outside of the region of inlet opening 17 of pipe 15 and outside of the region of nozzle 19.

In use, the operation of the embodiment of FIG. 1 is as follows. Reservoir 13 is filled with the desired amount of fresh water. Filter holder 20 is filled with an aromatics carrier or flavor-containing substance such as coffee or tea. Conventionally, a paper filter can be placed in filter holder 20 which is then attached to nozzle 19 and reservoir 13 is placed on top of carafe 10. The entire apparatus 11 is then placed in a microwave oven, which is turned on to heat the water in reservoir 13. At the same time, the air in carafe 10 is warmed and, accordingly, expands. The warming of the air is chiefly a result of radiant heat from the walls of reservoir 13. A small amount of water drips through drip opening 27 during the heating of the fresh water, and this small amount of water now in carafe 10 is also heated and vaporized by action of the microwaves. Accordingly, in conjunction with the warming of the air, some of the air within carafe 10 escapes through ventilation valve 26.

The operating time of the microwave oven is selected so that the water in reservoir 13 is brought to the boil. After the microwave oven is turned off, a partial vacuum develops in carafe 10, owing to the cooling down within carafe 10 and owing, in particular, to the condensation of the water vapor therein. In that manner, a pressure difference results between carafe 10 and reservoir 13, with the pressure in carafe 10 being the lower of the two. Given this pressure difference, the lower pressure in carafe 10 causes the heated water in reservoir 13 to be drawn over the highest point of pipe 15 into nozzle 19 and thus flow into filter holder 20. The water-dividing sieve 21 ensures that the hot water is spread out evenly over the aromatics carrier received in filter holder 20. After extraction of the aromatics, the heated water flows into carafe 10 as the finished hot beverage. Reservoir 13 is almost entirely emptied of water through pipe 15 thanks to the action of the low pressure developed in carafe 10.

The hot beverage collected in carafe 10 can be consumed immediately after taking off reservoir 13. After the brewing step, filter holder 20 can be removed from nozzle 19 and easily taken care of and cleaned. To shield the interior of filter holder 20 from the microwaves, filter carrier 20 is preferably made of metal or a metal-containing substance such as plastic.

Figure 2:
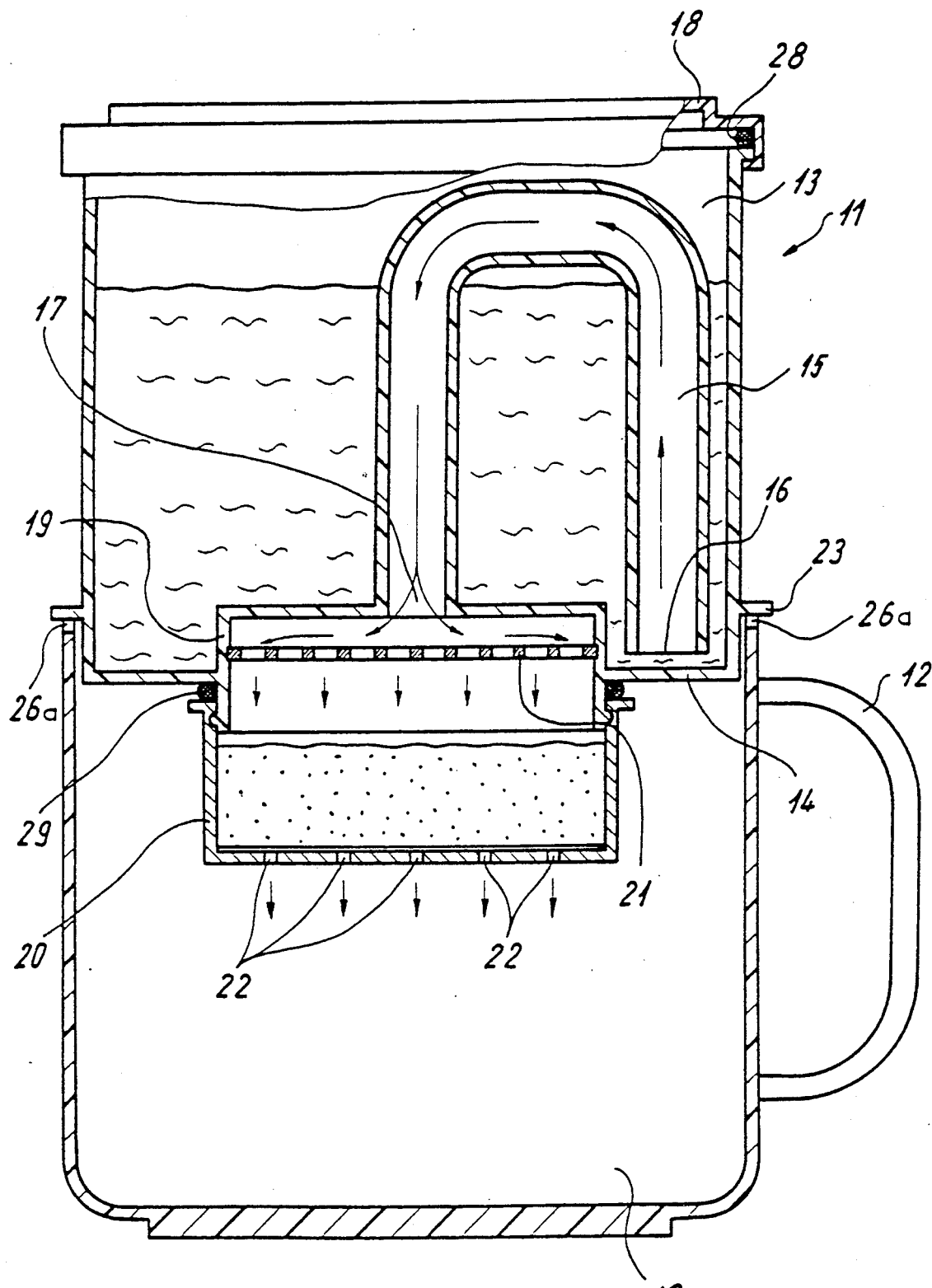
FIG. 2 is a sectional side elevational view of a further preferred embodiment of the invention.

Turning now to FIG. 2 another preferred embodiment of the invention will be described. The preferred embodiment of FIG. 2 differs from the preferred embodiment of FIG. 1 chiefly in that reservoir 13 is constructed in an airtight manner. This airtight sealing is achieved by the provision of a seal 28 in the region of lid 28 covering lid 28 on reservoir 13. Furthermore, the filter holder 20 is sealed off by a sealing ring 29 provided around the periphery of the nozzle 19.

An additional characterizing difference between the preferred embodiments of FIG. 2 and FIG. 1 is that the carafe 10 of FIG. 2 can be filled with and emptied of air by means of, for example, a ventilating opening 26a in the upper region of the rim of carafe 10 for communicating the interior of carafe 10 with the atmosphere. In other respects the construction of the apparatus of FIG. 2 is identical to that of FIG. 1.

The operation of the preferred embodiment of FIG. 2 differs from the operation of the embodiment of FIG. 1. As the reservoir 13 has an airtight seal, when the entire device with a full reservoir 13 is in an operating microwave oven, the water vapor derived from the heated water creates a pressure rise in reservoir 13. This pressure causes the heated water to be forced through pipe 15. As the heated water is forced out, the ever increasing space between the water surface and lid 18 is constantly completely filled with water vapor which supplies the necessary pressure for forcing the heated water out of reservoir 13. The heated water is rapidly forced out of reservoir 13 thanks to the high pressure developed in reservoir 13. However, the aromatics carrier placed in filter holder 20 gives rise to a certain amount of back pressure which acts against the flow of water streaming out of outlet 17, by which the filter holder and the space above the filter holder in the area of nozzle 19 fills completely with water. In that manner, the hot water is continually forced back through the aromatics carrier to a certain extent, such being particularly useful for the brewing of coffee.

Since, owing to the use of pipe 15, a complete emptying of reservoir 13 is practically impossible, there will always be water vapor present in reservoir 13 as long as the water dwelling in the reservoir 13 is being heated by microwaves. When the useful volume of water has been forced out of reservoir 13, the microwave oven is shut off. The water vapor remaining in reservoir 13 then cools off very quickly and condenses, thus giving rise to a partial vacuum. As there is no longer water filling pipe 15, air can be drawn back into reservoir 13 from vented carafe 10 until the pressure is the same as atmospheric pressure.

Figure 3:
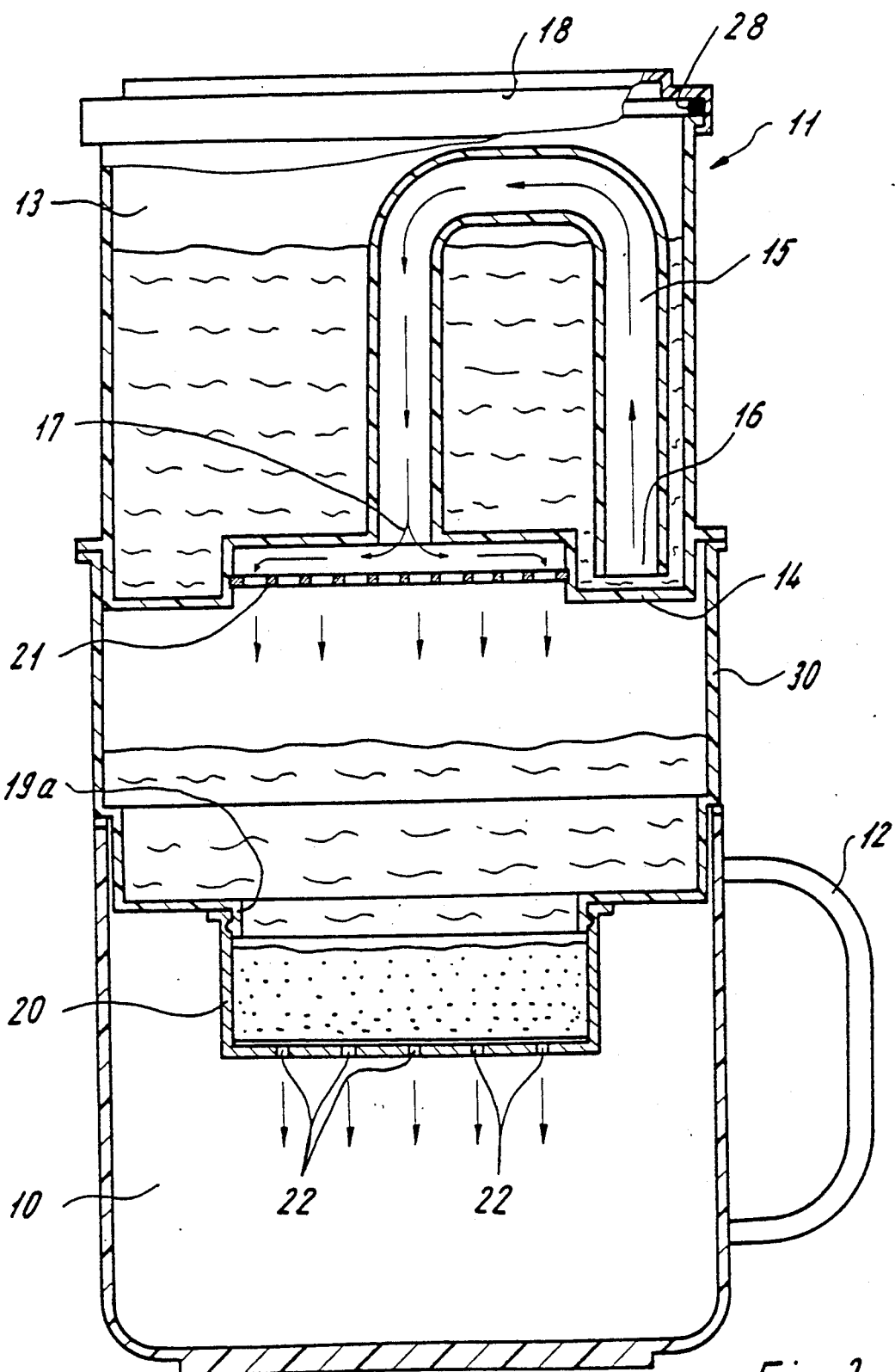
FIG. 3 is a sectional side elevational view of a still further preferred embodiment of the invention.

A still further preferred embodiment is shown in FIG. 3. The operating principle of the FIG. 3 embodiment is similar to that of the embodiment of FIG. 2. One difference between the embodiments of FIGS. 2 and 3 is the provision of an intermediate reservoir 30 between carafe 10 and reservoir 13. Intermediate reservoir 30 rests on carafe 10, while reservoir 13 rests on intermediate reservoir 30. Intermediate reservoir 30 has an extension 19a to which a filter holder 20 is attached. Reservoir 13 has an airtight seal in the region of lid 18 by means of a seal 28 in a manner analogous to the embodiment of FIG. 2.

The volume of intermediate reservoir 30 is at least as large as the volume of reservoir 13.

In use, the heated water in the embodiment of FIG. 3 is forced through pipe 15 as a result of the higher pressure developed in reservoir 13 when the device is heated in a microwave oven similarly to the embodiment of FIG. 2. The resulting hot water then collects within intermediate reservoir 30 at substantially atmospheric pressure thanks to the presence of the aromatics carrier in filter holder 20 that keeps the water from flowing out as quickly as it flows in. Accordingly, the hot beverage is produced in a manner similar to the way in which manually operated devices work.

It will be understood that the above description of the present invention is susceptible to various modifications, changes, and adaptations, and the same are intended to be comprehended within the meaning and range of equivalents of the appended claims.

What is claimed is:

1. In an apparatus for preparing hot beverages in a microwave oven, said apparatus including a carafe for receiving the finished brewed hot beverage, a reservoir for retaining fresh water therein, said reservoir having a bottom being receivable on said carafe, a shut-off member disposed in said reservoir, said shut-off member having an inlet disposed in the interior of said reservoir and having an outlet extending through said bottom of said reservoir, the improvement wherein:

said shut-off member comprises a siphoning pipe;
said reservoir being substantially air tight; and
said carafe having a vent means for allowing air to enter into and exit from said carafe;
the improvement further comprising an intermediate reservoir disposed between said reservoir and said carafe; said intermediate reservoir having a volume at least as large as the volume of said reservoir means defining a downwardly opening extension in said bottom of said intermediate reservoir and a filter holder detachably attached to said extension.

2. An apparatus as recited in claim 1, further comprising a water-dividing sieve disposed between said outlet opening of said shut-off member and said filter holder.

3. An apparatus as recited in claim 1, wherein said filter holder comprises one of a metal and a metal-containing substance.

4. An apparatus as recited in claim 1, further comprising an upper rim defined on said carafe, and wherein said vent means includes at least one orifice.

5. An apparatus as recited in claim 1, further comprising a lid disposed on said reservoir, and a seal disposed between said lid and said reservoir.

* * * * *